United States Patent
Pollak et al.

(10) Patent No.: US 6,654,600 B1
(45) Date of Patent: Nov. 25, 2003

(54) METHOD AND APPARATUS FOR AUTHORIZING USE OF CELLULAR TELEPHONE UNITS

(75) Inventors: Frederick John Pollak, Coconut Grove, FL (US); Victor Maldonado, Miami, FL (US)

(73) Assignee: Tracfone Wireless, Inc., Miami, FL (US)

(*) Notice: Subject to any disclaimer, the term of this patent is extended or adjusted under 35 U.S.C. 154(b) by 313 days.

(21) Appl. No.: 09/662,538

(22) Filed: Sep. 15, 2000

(51) Int. Cl.[7] .................................................. H04L 9/00
(52) U.S. Cl. .................. 455/405; 455/406; 455/407; 455/408; 379/114.2
(58) Field of Search .................. 455/406, 407–408, 455/405, 411, 414; 705/40, 34, 26; 379/114.12, 114.2

(56) References Cited

U.S. PATENT DOCUMENTS

| 4,718,009 | A | | 1/1988 | Cuervo |
| 5,025,138 | A | | 6/1991 | Cuervo |
| 5,719,926 | A | | 2/1998 | Hill |
| 5,903,633 | A | | 5/1999 | Lorsch |
| 5,915,093 | A | | 6/1999 | Berlin et al. |
| 5,915,226 | A | | 6/1999 | Martineau |
| 5,953,398 | A | | 9/1999 | Hill |
| 5,991,748 | A | * | 11/1999 | Taskett .................. 705/41 |
| 6,003,770 | A | | 12/1999 | Schilling |
| 6,115,601 | A | * | 9/2000 | Ferreira .................. 455/406 |
| 6,446,048 | B1 | * | 9/2002 | Wells .................. 705/35 |
| 6,505,171 | B1 | * | 1/2003 | Cohen .................. 705/26 |

FOREIGN PATENT DOCUMENTS

CA  1280213  2/1991

* cited by examiner

Primary Examiner—William Trost
Assistant Examiner—Brandon J Miller
(74) Attorney, Agent, or Firm—James S. Finn

(57) ABSTRACT

A computer implemented service transmits authorization codes for cellular service by way of a network connection with a user system. The user can purchase additional activation time for an already active pre-paid service. The user can also convert a previously purchased coded card to an authorization code by interacting with the service.

11 Claims, 4 Drawing Sheets

METHOD AND APPARATUS FOR AUTHORIZING USE OF CELLULAR TELEPHONE UNITS

FIELD OF THE INVENTION

The present invention relates to cellular communication services. More particularly, the invention relates to a pre-paid cellular telephone service.

BACKGROUND

Cellular telephones are fast becoming a necessity in today's world. Almost every person has, in one way or another, access to a cellular telephone. The service that the cellular telephone requires generally takes one of two forms. A first form is contract-based subscription with a cellular service provider (e.g. "provider"). The user is usually billed on a monthly basis for the service. While a deposit may be required to initiate service, the user pays for the monthly services used at the end of the month, after having already used the services. Thus, credit must be extended to the user so as to allow the payment to follow the provision of services. However, certain users may not qualify for such credit. In addition, certain users wish to remain anonymous and do not wish to establish a record of calls made or received. Accordingly, users are offered a second option, namely pre-paid cellular services.

Providers offering pre-paid cellular services allow the user the option of paying for a predetermined amount of services prior to using the service. Thus, the provider is not extending credit to the user, as payment for the services is made in advance.

Typically, a user wishing to purchase pre-paid services from a provider, buys a card carrying a first code, which corresponds to a credit level. The user then telephones the provider, tells an operator the first code, and obtains an authorization code that, when keyed into the cellular unit, enables service. The user is then able to use the service until the credit is exhausted. In another form, the user purchases an electronic card from the provider. The electronic card carries a code that enables the cellular unit for a predetermined time.

There is, however, no convenient way to replenish credit for a pre-paid service. In addition, the authorization process is cumbersome and sometimes results in failure due to human errors in undertaking the authorization transaction. Therefore, there is a need for a convenient and efficient method for authorizing the use of pre-paid cellular units.

SUMMARY OF THE INVENTION

In accordance with the present invention, a system and method for authorizing cellular service is provided. The system provides a convenient and efficient way to transmit authorization codes to customers. The system does not require human operators and therefore has cost saving advantages.

DETAILED DESCRIPTION

1. Glossary of Terms and Acronyms

Figure 1:
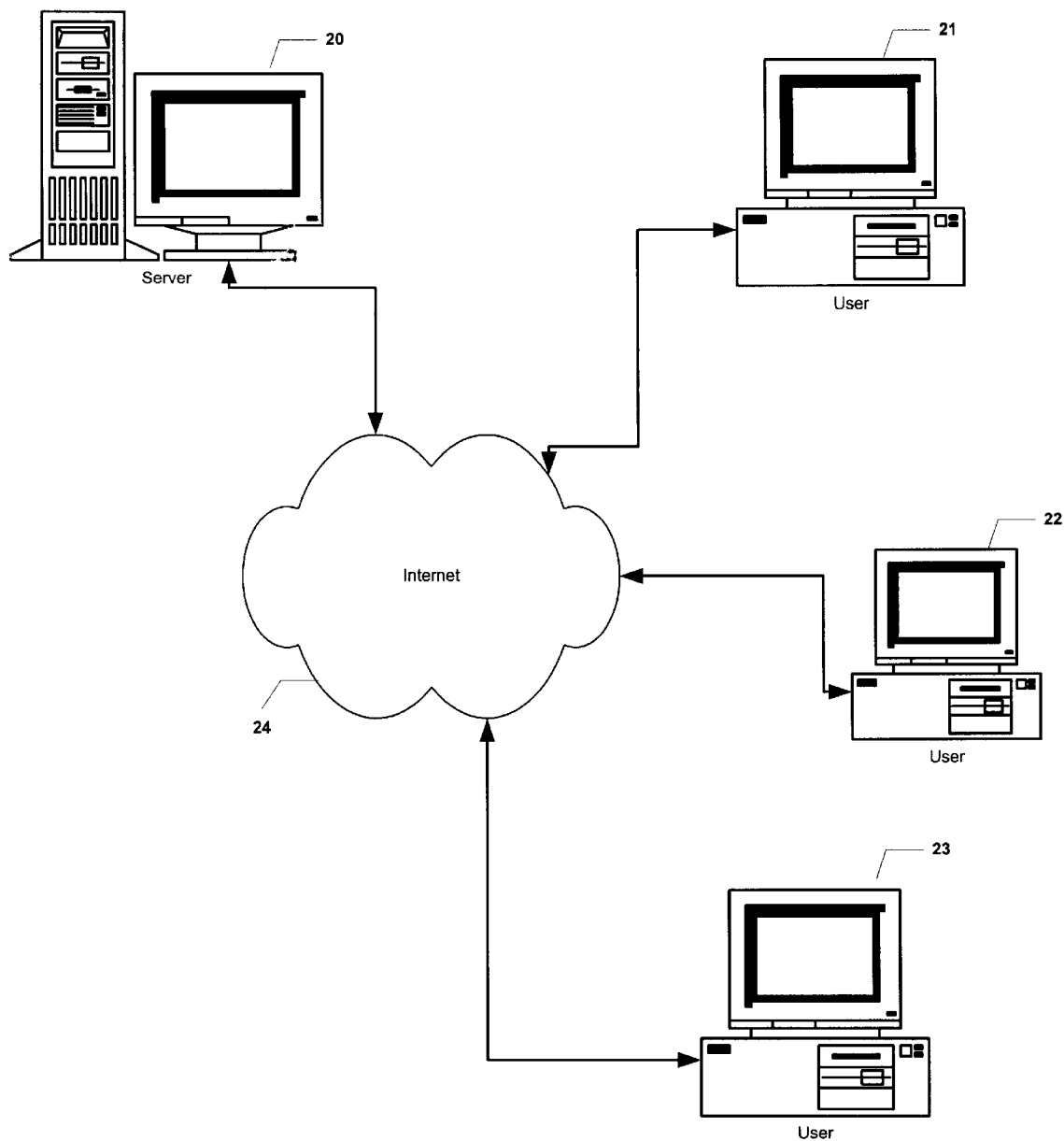
FIG. 1 illustrates a client-server arrangement in accordance with the present invention.

The following terms and acronyms are used throughout the detailed description:

Client-Server. A model of interaction in a distributed system in which a program at one site sends a request to a program at another site and waits for a response. The requesting program is called the "client" and the program which responds to the request is called the "server." In the context of the World Wide Web (discussed below), the client is a "Web browser" (or simply "browser") which runs on a computer of a user; the program which responses to browser requests by serving Web pages is commonly referred to as a "Web server." The client-server model commonly includes a network that facilitates the communication between the programs. The network may operate under various protocols and may be facilitated in various configurations. In the context of the Internet, the network employs an HTTP protocol (discussed below) in conjunction with TCP/IP, and is configured as a packet switching network.

Hyperlink. A navigational link from one document to another, or from one portion (or component) of a document to another. Typically, a hyperlink is displayed as a highlighted word or phrase that can be selected by clicking on it so as to jump to the associated document or documented portion.

Hypertext System. A computer-based informational system in which documents (and possibly other types of data entities) are linked together via hyperlinks to form a user-navigable "web."

Internet. A collection of interconnected networks (public and/or private) that are linked together by a set of standard protocols (such as TCP/IP and HTTP) to form a global, distributed network. While this term is intended to refer to what is now commonly known as the Internet, it is also intended to encompass variations which may be made in the future, including changes and additions to existing standard protocols.

World Wide Web ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web Site. A computer system that serves informational content over a network using the standard protocols of the World Wide Web. Typically, a Web site corresponds to a particular Internet domain name, such as "topptelecomm.com," and includes the content associated with a particular organization. As used herein, the term is generally intended to encompass both (i) the hardware/software server components that serve the informational content over the network, and (ii) the "back-end" hardware/software components, including any non-standard or specialized components, that interact with the server components to perform services for Web site users.

HTML (Hyper Text Markup Language). A standard coding convention and set of codes for attaching presentation and linking attributes to informational content within documents. During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally, in specifying how the Web browser is to display the document, HTML tags can be used to create links to other Web documents (commonly referred to as "hyperlinks").

HTTP (Hyper Text Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions.

URL (Uniform Resource Locator). A unique address which fully specifies the location of a file or other resource on the Internet. The general format of a URL is protocol://machine address:port/path/filename.

2. System Configuration and Operation

FIG. 1 illustrates an arrangement of a client-server system in accordance with the present invention. The system includes a server 20, a plurality of client devices 21, 22, 23, and a network connection 24. The server 20 communicates with the client devices 21, 22, 23, by employing the network connection 24. In one embodiment, the server 20 is a website which implements a web-store that provides authorization codes for cellular telephone units. The network connection is preferably facilitated by an Internet connection. The user devices 21, 22, 23, are preferably personal communication devices that have Web browsing capabilities. Examples of such devices include personal computers, PDAs, and cellular telephones.

In operation, the server 20 stores HTML pages that are provided to the user devices 21, 22, 23, in response to requests in the form of URL submissions. The HTML pages include static code pages as well as dynamic code pages, which are constructed based on user input and other system criteria. The HTML pages further include controls which facilitate user data entry. Such controls include entry boxes, selection boxes, toggle buttons, and drop down lists. The user device operator can employ the device to transmit HTTP data to the server. The structure and operation of the server 20 are discussed below.

Figure 2:
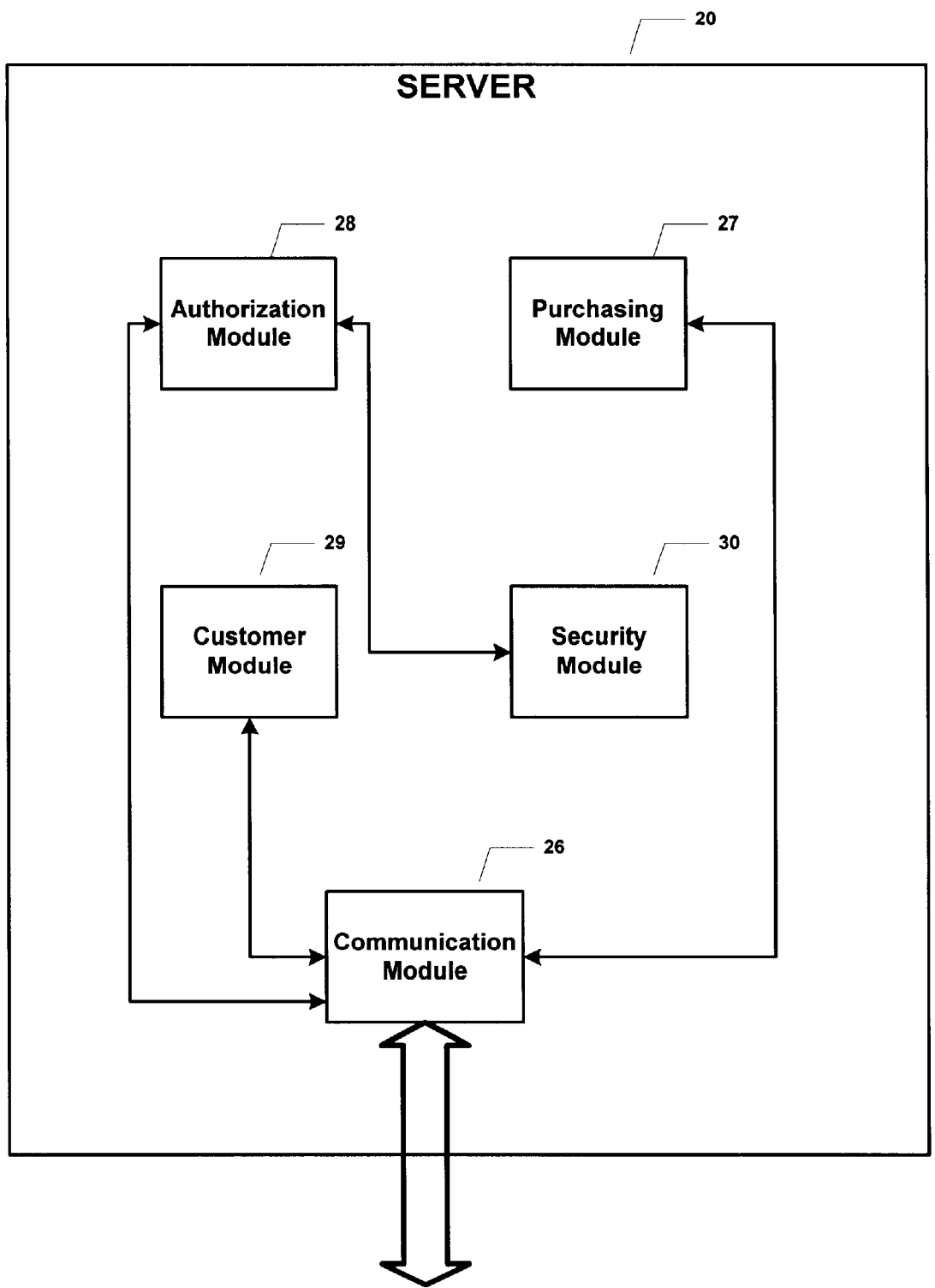
FIG. 2 illustrates the logical arrangement of a server in accordance with the invention.

FIG. 2 illustrates the structure of a server 20 of the invention. As may be appreciated by those skilled in the art, the illustrated structure is a logical structure and not a physical one. Accordingly, the illustrated modules can be implemented by employing various hardware and software components. In addition, two or more of the logical components can be implemented as a single module that provides functionality for both components. In one embodiment, the components are implemented as software program modules.

The server includes a communication module 26, a customer module 29, a security module 30, an authorization module 28, and a purchasing module 27. The communication module 26 is coupled to the authorization module 28 to receive authorization codes which are used to activate cellular units. The communication module 26 is also coupled to the customer module 29 so as to retrieve customer account data, if available. In an alternate embodiment, the customer module 29 is not included in the server 20. The communication module 26 is also coupled to the purchasing module 27 to execute payment transactions. For example, a credit card payment transaction is facilitated by employing the purchasing module 27.

The authorization module 28 is further coupled to the security module 30, which generates authorization codes. The security module 30 provides functions and algorithms for generating activation codes. For example, in one embodiment, the activation code for a particular unit may depend on the unit's registration number. Accordingly, the security module 30 stores such data corresponding to each unit. When an activation code for the unit is requested, the security module 30 responds by transmitting the activation code associated with the record for the unit's registration number.

In operation, the communication module 26 provides HTML pages to a user system in response to HTTP requests. The communication module 26 responds to HTTP requests by employing the various modules of the server. For example, in response to a request for a customer information page, the communication module 26 requests data from the customer module 29 so as to generate a dynamic HTML page, which is transmitted to the user system.

When the user requests to purchase credit for a pre-paid account that is exhausted, the communication module 26 transmits a purchase Web-page to the user system. The user employs controls within the received Web-page so as to enter payment data, including payment information. The user system transmits the resultant data to the communication module 26. The payment transaction is then executed by the purchasing module 27, which provides a corresponding response to the communication module 26. An authorization code is then transmitted to the user system. In one embodiment, the authorization code is transmitted over a secure connection such as SSL. The user may then enter the authorization code into the cellular unit to activate or replenish service. In an alternative embodiment, the authorization code is transmitted over the cellular communication link to the cellular unit without the need for the user to manually enter a code. In yet another embodiment, where the credit level for a user is stored at the service station, the user does not receive an authorization code but is able to use the service shortly after making the purchase.

Figure 3:
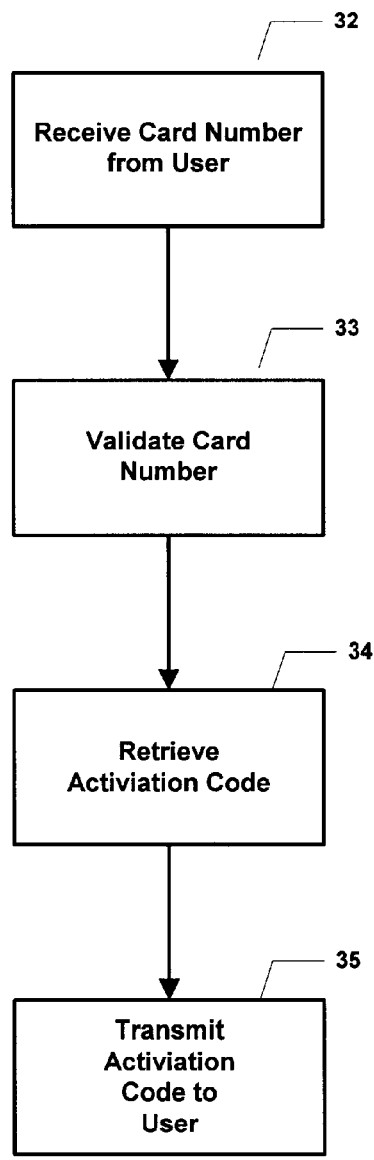
FIG. 3 is a flow diagram illustrating the operation of the server when facilitating the authorization of services for a cellular unit.

FIG. 3 is a flow diagram illustrating the operation of the server 20 when providing an authorization code to a user system after the user has already paid for the service. For example, the user may have purchased a card for pre-paid airtime by tendering cash payment at a physical store. The purchased card preferably carries a code. The code is preferably converted to an authorization code before it can activate the purchased service.

The user system connects to the server system by way of the Internet connection. The user system receives a Web-page in response to a request for authorization for a pre-paid card. The user employs controls provided by the Web-page to enter the card number. The data from the controls is transmitted to the server 20. The card number is then received by the communication module of the server system (step 32). The communication module 26 transmits the card number to the authorization module 28 along with data requesting a conversion of the code to an authorization code. The authorization module 28 responds to the request by transmitting the code to the security module 30. The security module 30 receives the code and validates the card number (step 33). In one embodiment, the card number is validated by searching for the card number in a database. If the entry associated with the card number indicates that the number is valid, an authorization code is retrieved by the security module 30. The authorization code is then transmitted to the user system, preferably as part of an Web-page. If the code is not a valid code, the security module 30 transmits a signal to the authorization module 28 to indicate to the user that the code is not valid.

Figure 4:
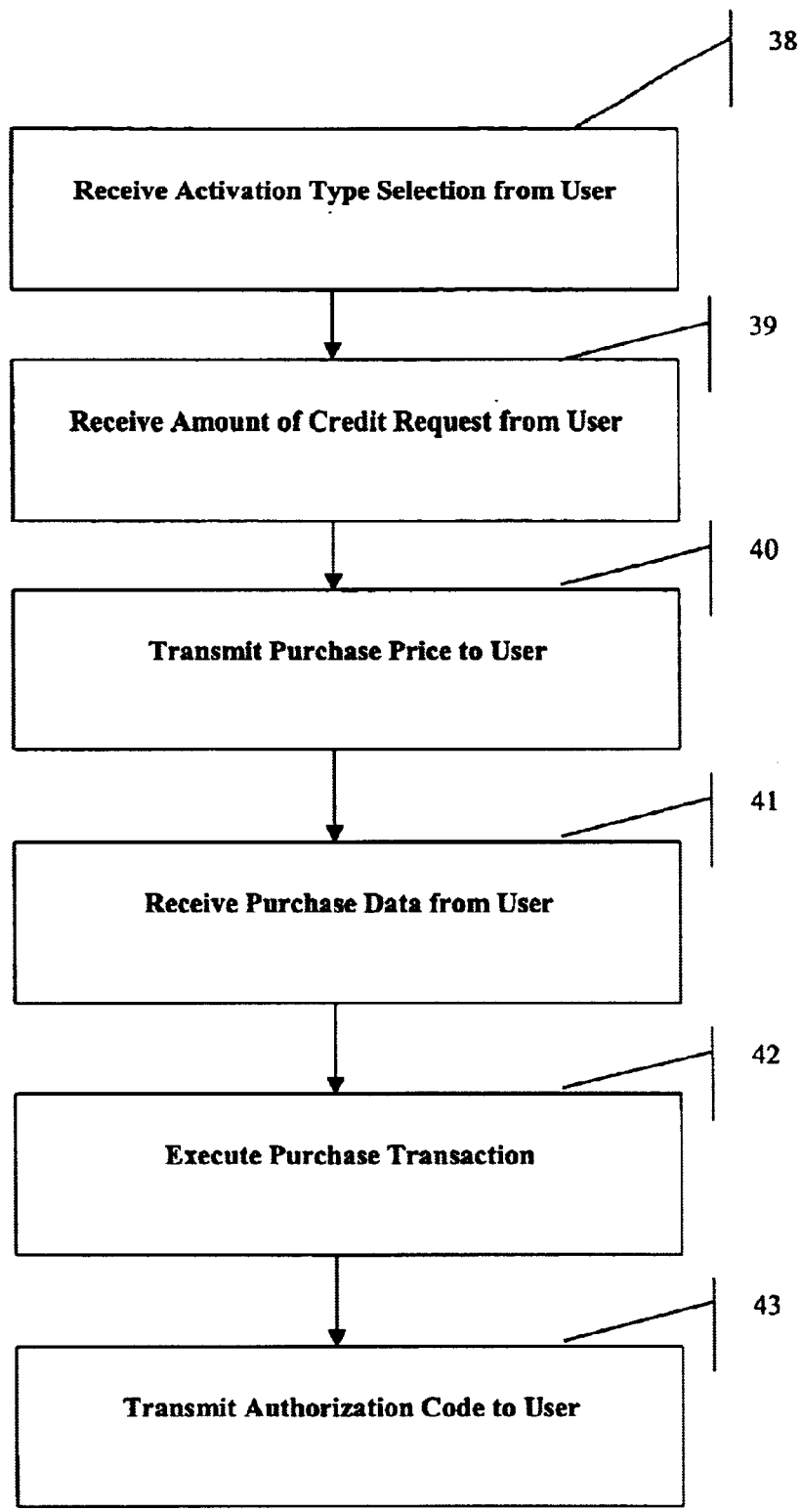
FIG. 4 is a flow diagram illustrating the operation of the server when facilitating a purchase of prepaid services.

FIG. 4 illustrates the operation of the server 20 when the user selects to purchase an activation code from the provider. The user first connects to the provider website by submitting the provider website URL in the user browser application. The user then selects to purchase an authorization code from a start Web-page. The user is provided with a second Web-page that requests an activation type selection. For example, the user may wish to activate local calling functionality only. Additionally, the user may wish to activate roaming functionality. Accordingly, the user can select the desired activation from the controls provided by the Web-page (step 38). In addition, the user is prompted to enter an amount of service credit in an entry box of the page.

The server 20 receives the user data (step 39) and provides a Web-page to the user system that includes a payment indication for the requested authorization (step 40). The user is provided with controls which allow for the selection and entry of payment data. For example, the user selects a credit card type and enters a credit card number with a corresponding expiration date. The server 20 receives the payment data from the user and transmits the data to the purchasing module 27 (step 41). The purchasing module 27 processes the data according to the selected payment type (step 42). If the payment transaction is successful, the purchasing module 27 transmits a corresponding signal to the communication module 26. The communication module 26 requests an authorization code from the authorization module 28. At this time, the user may be required to provide a unit identification number so as to enable the server 20 to select a proper authorization code for the unit. In another embodiment, the server provides an authorization code regardless of the unit identification number. The authorization module 28 employs the security module 30 to identify an authorization code for the user request, as discussed above. The authorization code is then transmitted to the user system, preferably as part of a Web-page (step 43). The authorization code is advantageously provided over a secure connection.

Although the present invention was discussed in terms of certain preferred embodiments, the description is not limited to such embodiments. Rather, the invention includes other embodiments including those apparent to a person of ordinary skill in the art. Thus, the scope of the invention should not be limited by the preceding description but should be ascertained by reference to the claims that follow.

What is claimed is:

1. A method for replenishing a pre-paid telephone service by a server system, comprising:

the server system providing a first Web page to a user of the service, the first Web page including at least an interface for-entering a cellular unit number;

the server system providing an interface on said first Web page for purchasing additional airtime for the cellular unit associated with the number;

the server system receiving a request for the purchase of additional airtime, the request including a cellular unit number and financial transaction data for purchasing additional airtime; and the server system transmitting a one-time-use activation code in response to the purchase of additional airtime by employing a second Web page including the code, the one-time-use activation code corresponding to the amount of additional airtime purchased, the one time-use activation code corresponding to the cellular unit associated with said cellular unit number.

2. A method for activating a pre-paid telephone card by a server system, comprising:

the server system providing a web page to a user, the Web page including at least an interface for entering a cellular unit number;

the server system receiving a one-time-use code from said user, the code provided through an interface in said web page, the code corresponding to a pre-paid telephone card associated with a predetermined amount of airtime;

the server system verifying the code received from the user to ensure that the code has not been previously used; and transmitting an activation code to a cellular unit associated with the cellular unit number in response to positive verification of said code from the user, the activation code corresponding to the amount of airtime verified for the received code.

3. A computer implemented system for providing authorization codes for service activation to customers, the system comprising:

a communication module, the communication module receiving a request for an authorization code from a customer system, the communication module coupled to the customer system by a network connection, the communication module providing a web page to the user to facilitate entry of financial data for purchasing additional airtime for a cellular unit, the communication module transmitting a one-time-use authorization code to said customer system;

an authorization module, the authorization module receiving requests for one-time-use authorization codes from the communication module, the authorization module transmitting a one-time-use authorization code to the communication module in response to a valid request; and a security module, the security module receiving transaction data and request data from the authorization module to validate requests for one-time-use authorization codes.

4. The method of claim 1, further comprising generating said activation code by reference to said cellular unit number.

5. The method of claim 1, wherein said providing a web page and said receiving a request is by an HTTP communication protocol.

6. The method of claim 1, wherein said transmitting an activation code is over a Secure Socket Layer communication session.

7. The method of claim 1, wherein said activation code is directly transmitted to a cellular unit associated with said cellular unit number.

8. The method of claim 1, wherein said activation code is transmitted to a service station server tracking user airtime credit.

9. The method of claim 2, wherein said pre-paid telephone card is purchased at a physical store.

10. The method of claim 2, wherein said first code is a unique code.

11. The method of claim 3, wherein said request received by said communication module includes a service type, an amount of airtime, and payment data.

* * * * *